(12) United States Patent
Sakano

(10) Patent No.: US 6,292,214 B1
(45) Date of Patent: Sep. 18, 2001

(54) MICROSCOPIC DIGITAL PHOTOGRAPHY SYSTEM

(75) Inventor: Hitoshi Sakano, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/141,363

(22) Filed: Aug. 27, 1998

(30) Foreign Application Priority Data

Aug. 29, 1997 (JP) .................................................. 9-249330

(51) Int. Cl.⁷ .............................. H04N 7/18; G02B 21/36; G02B 23/00
(52) U.S. Cl. ............................................. 348/79; 396/432
(58) Field of Search .............................. 348/79; 359/363, 359/368–369, 381, 385; 396/429, 432, 51, 276; 250/201.2, 201.3; 362/276

(56) References Cited

U.S. PATENT DOCUMENTS

| | | | |
|---|---|---|---|
| 4,786,154 | * 11/1988 | Fantone et al. | 359/369 |
| 4,845,552 | * 7/1989 | Jaggi et al. | 382/128 |
| 5,149,972 | * 9/1992 | Fay et al. | 250/461.1 |
| 5,233,197 | * 8/1993 | Bowman et al. | 250/461.1 |
| 5,657,128 | * 8/1997 | Muller et al. | |
| 5,684,530 | * 11/1997 | White | 348/131 |
| 5,691,840 | * 11/1997 | Bae et al. | 359/386 |
| 5,825,532 | * 10/1998 | Mochizuki et al. | 359/368 |
| 5,844,598 | * 12/1998 | Janesick | 348/79 |
| 5,912,699 | * 6/1999 | Hayenga et al. | 348/132 |
| 6,014,166 | * 1/2000 | Guerra | 348/79 |
| 6,091,911 | * 7/2000 | Sakano et al. | 396/432 |

* cited by examiner

*Primary Examiner*—Vu Le
(74) *Attorney, Agent, or Firm*—Oliff & Berridge, PLC

(57) ABSTRACT

When an image of a sample is photographed by an image pickup device and it is converted into an electric signal, then the electric signal is converted by a controller into a signal suitable for a display unit, and the image of the sample is displayed on a screen of the display unit. A light flux from the screen of the display unit is guided by an optical system to an observing optical system. The display screen, on which the image of the sample is displayed, can be observed through an eyepiece lens of the observing optical system. Accordingly, it is easy to confirm the relationship between the size of the picture element of the image pickup device and the image to be photographed and the resolving power for the image intended to be photographed. The display unit and the image pickup device are accommodated in a microscope housing. Therefore, the installation area and the size can be made equivalent to those used for the conventional system.

16 Claims, 4 Drawing Sheets

MICROSCOPIC DIGITAL PHOTOGRAPHY SYSTEM

BACKGROUND OF THE INVENTION

1. Field of the Invention:

The present invention relates to a microscopic digital photography system. In particular, the present invention relates to a microscopic digital photography system comprising a microscope and an image pickup device for photographing an image of a sample observed by using the microscope and making conversion into an electric signal.

2. Description of Related Art:

A microscopic digital photography system has been hitherto known for photographing and recording an image of a sample observed by using a microscope. In this system, a reflecting member is arranged on an optical axis (optical axis of an objective lens and an imaging lens) of the microscope. The reflecting member is used to divide the optical path into those concerning an observing optical system and an image pickup optical system. A magnified image of the sample, which is formed on an image plane on the side of the observing optical system, is observed through an eyepiece lens. The light flux of the sample image, which is focused on the image plane on the side of the image pickup optical system, is photographed by an image pickup device arranged on the image plane. An obtained image is converted into an electric signal.

The method for dividing the optical path into those concerning the observing optical system and the image pickup optical system includes several systems. FIGS. 4 and 5 show representative systems with optical paths.

FIG. 4 shows a system in which a half prism 102 is arranged on an optical axis 104 of a microscope between an objective lens 106 and an imaging lens 108B. In this system, the optical path, through which the light flux (light flux of an image of a sample 110) coming from the objective lens 106 is transmitted by the aid of the half prism 102, is utilized as an observing optical path. In this observing optical path, the light flux is focused in the vicinity of a front focal plane of the eyepiece lens 114 through the imaging lens 108B and a view prism 118 to observe an image 112. On the other hand, a second imaging lens 108D is arranged on an optical path for the light flux which comes from the objective lens 106 and which is reflected by the half prism 102. An image pickup device 116 is arranged on an image formation plane of the second imaging lens 108D. Thus, the image pickup optical path is constructed. This system is used for an intermediate body tube type beam splitter in which a beam splitter is arranged in an intermediate body tube in a microscope of the type capable of installing an intermediate body tube unit between a main microscope body and an observing body tube. The system is constructed by arranging a digital still camera containing an image pickup device, at an output section of an optical path divided by the beam splitter to obtain a magnified image of a sample. Another intermediate body tube is also known, in which an image pickup device is contained in a housing.

FIG. 5 shows a system in which a view prism 120 is arranged over an imaging lens 122 on an optical axis of a microscope. In this system, a magnified image 124 of a sample is observed, which is formed in the vicinity of a front focal plane 124 of an eyepiece lens 126 disposed on a side of an optical path for a light flux (light flux of the image of the sample 110) which comes from an objective lens 106 and which is reflected by the view prism 120. An image pickup device 116 is arranged on an image plane on a light path for a light flux transmitted through the view prism 120. A magnified image, which is formed on the image plane, is photographed. This system is adopted in many microscopes having a trifurcate body tube provided with a binocular unit for observation and a straight barrel for photographing operation. Such a system is constructed by attaching, to the straight barrel, a digital still camera containing an image pickup device. Another body tube is also used, in which an image pickup device is contained in a housing. In the system constructed as described above, a photographer operates a focusing handle of the microscope while looking into the binocular unit of the body tube so that the focal point is adjusted to the sample.

Besides, a system is also known, in which a digital still camera of the single-lens reflex camera type is used. In this case, the focusing operation is performed for the microscope by making observation through an optical finder of the digital still camera. In other cases, the digital still camera is connected to a computer. A real time image, which is captured by an image pickup device, is displayed on a monitor of the computer. The focusing operation is performed for the microscope while observing of the image.

However, the microscopic digital photography system, which adopts the system shown in FIGS. 4 and 5 described above, has an inconvenience in that it is impossible to confirm the range of the image projected onto the picture element of the image pickup device during the photographing operation.

When the photographer performs the focusing operation for the microscope while looking into the binocular unit of the body tube so that the focal point is adjusted on a sample, the resolving power for the image, which is obtained by looking into the binocular unit by the photographer, is generally different from the resolving power possessed by the image photographed by the image pickup device of the digital still camera. The resolving power, which is obtained by viewing a photographing range with human eyes, is converted into the number of picture elements of the image pickup device as follows:

((photographing length in longitudinal direction/resolving power of naked eye)×2)×((photographing length in transverse direction/resolving power of naked eye)×2).

It is now assumed, for example, that the field number of a 10×eyepiece lens is 20 mm, and the photographing range is 12 mm×16 mm (diagonal: 20 mm) inscribing the size of the observing field. The resolving power of the human eye is generally 0.14 mm at the distance of distinct vision (250 mm). Therefore, the resolving power is 0.014 mm on the image plane when a sample is viewed through the 10×eyepiece lens. In order to obtain a resolving power approximately equivalent to the resolving power of the human eye, the following number of picture elements is required:

$$((12/0.014)\times 2)\times((16/0.014)\times 2)=3918367.$$

That is, it is necessary to use a number of picture elements of about four millions.

However, the digital still camera, which is provided with an image pickup device having a number of picture elements of four millions, is used for commercial digital photographs, but it is not generally used. Therefore, such an instrument tends to be extremely expensive. In general, a digital still cameral having a number of picture elements of about three hundred thousand is utilized. Therefore, when the entire observing field is photographed by using the general digital still cameral having the number of picture elements of about three hundred thousand, the resolving power of the photographed image is extremely coarse as compared with the image captured by the naked eye observation. As a result, it is impossible to obtain an image expected by the photographer.

Therefore, even when the digital still camera having a small number of picture elements is used, the photographing operation is preferably performed by magnifying and projecting a narrow range of a sample onto the image pickup device plane, not by projecting the entire observing field onto the plane, so as to make it possible to improve the resolving power converted into one concerning the sample dimension corresponding to one picture element, i.e., the dimension of the sample. However, if a sample is magnified and photographed, the photographing range for the sample becomes narrow. Therefore, the photographer is forced to perform the operation such that a test shot is taken in order to obtain a desired image, and the photographing magnification is changed while estimating the photographed image to make a balance between a necessary size of the photographing range and necessary fineness of the image. For this reason, there has been an inconvenience that the photographing operation requires a lot of time and labor.

A similar inconvenience has also occurred when the focusing operation is performed for the microscope through an optical finder by using a digital still camera of the single-lens reflex camera type.

On the other hand, in the case of the system comprising the digital still camera connected to the computer, the real time image captured by the image pickup device of the camera is displayed on the monitor of the computer. It is possible to set the photographing range and perform the focusing operation while observing the displayed image. In this case, the image captured by the image pickup device can be confirmed on the monitor screen. However, in this case, it is necessary to install the monitor together with the computer disposed adjacent to the microscope. Therefore, an inconvenience arises in that the occupied area is increased on the desk.

In recent years, a small size personal computer, which requires a small area for installation, is generally used. Therefore, the required installation area is not so large when such a small size personal computer is used. However, the display section is small for the display screen and for a separately placed small size monitor. Therefore, the displayed image is difficult to be seen. Such a display is not suitable to confirm the resolving power for the photographed image. On the other hand, an instrument of the Braun tube type, which has a large display screen, requires an extremely large installation area. A thin type instrument, which is based on the use of a liquid crystal or the like, is also available. However, those having a large display screen are expensive. In addition, in the case of the system comprising the digital still camera connected to the computer, it is necessary to perform the focusing operation while viewing the display screen placed outside of the microscope. Therefore, such a system is different in way of use from an ordinary microscope, causing an inconvenience that such a system feels difficult to be used.

SUMMARY OF THE INVENTION

The present invention has been made in order to dissolve the inconveniences involved in the conventional techniques, an object of which is to provide a microscopic digital photography system and a photographing method in which it is possible to easily confirm the resolving power and the range of an image photographed by an image pickup device during photographing operation and it is easy to perform the operation.

Another object of the present invention is to provide a microscopic digital photography system and a photographing method in which an image photographed by an image pickup device can be observed in real time, and it is unnecessary to use a large installation area.

According to a first aspect of the present invention, there is provided a microscopic digital photography system for observing and photographing a sample, comprising:

a microscope having an objective lens and an eyepiece lens;

an image pickup device for photographing an image of the sample formed by the objective lens;

a display unit having a screen for displaying the image;

a controller for controlling the display unit so that the image is displayed on the screen of the display unit on the basis of a signal outputted from the image pickup device; and a first optical system for guiding a light flux from the screen to the eyepiece lens.

According to this system, the controller controls the display unit so that the image of the sample photographed by the image pickup device is displayed on the screen of the display unit. The first optical system, which is herein referred to as "the displaying optical system", guides the light from the screen of the display unit to the eyepiece lens. The photographer is able to previously observe the image of the sample photographed by the image pickup device by the aid of the screen. Accordingly, it is possible to easily confirm the relationship between the size of the picture element of the image pickup device and the image to be photographed, and the resolving power of the image intended to be photographed. When the operator observes a magnified image of the sample, the display screen may be observed through the eyepiece lens, or observation may be made directly through the microscope in the same manner as in the ordinary microscopic observation for a sample. The controller may be operated, for example, such that the image from the image pickup device, which is converted into an electric signal, is converted into a signal suitable for the display unit.

The system may further comprise at least one reflecting optical element having a first reflecting surface for guiding a light flux from the objective lens to the image pickup device and a second reflecting surface for constructing the displaying optical system, wherein the first and second reflecting surfaces are capable of being integrally inserted into and retracted from an optical path between the objective lens and the eyepiece lens. By doing so, when the reflecting optical element having the first and second reflecting surfaces is inserted into the optical path between the objective lens and the eyepiece lens or an imaging lens of an observing optical system, then the light flux coming from the objective lens is directed by the first reflecting surface to the image pickup device, and the image of the sample is photographed by the image pickup device. The light flux, which comes from the image of the sample formed on the display screen of the display unit, is directed by the second reflecting surface to the eyepiece lens. Accordingly, it is possible for the photographer to observe the image on the screen through the eyepiece lens. On the other hand, when the reflecting optical element having the first and second reflecting surfaces is retracted from the optical path, the light flux coming from the objective lens comes, for example, into the imaging lens of the observing optical system. It is possible for the photographer to observe, through the eyepiece lens, the image of the sample formed by the imaging lens installed between the objective lens and the eyepiece lens. Therefore, the image formed by the microscope can be easily compared with the image intended to be photographed (image displayed on the display screen) by inserting and retracting the reflecting optical element having the first and second reflecting surfaces with respect to the optical path between the objective lens and the eyepiece lens or the imaging lens. Accordingly, it is easier to confirm the relationship between the size of the picture element of the image pickup device and the image to be photographed. The system may comprise a frame for holding the reflecting optical element and a movement unit for inserting or retracting the frame with respect to the optical path between the objective lens and the eyepiece lens. In this system, the term "at least one reflecting optical element having the first and second reflecting surfaces" resides in a concept which includes not only single optical elements provided with a plurality of reflecting surfaces such as prisms, but also combinations of a plurality of optical elements such as a combination of a mirror having the first reflecting surface and a mirror having the second reflecting surface. The system may also comprise a second optical system, which is herein referred to as "an imaging pickup optical system", for guiding the image of the sample formed by the objective lens to the image pickup device.

The system may further comprise a variable power optical system arranged on the optical path between the objective lens and the first reflecting surface. The variable power optical system can be used to change the photographing magnification (magnification of the image projected onto the image pickup plane of the image pickup device). Therefore, it is possible to easily change the relationship between the size of the picture element of the image pickup device and the range of the sample image projected thereonto. It is possible to easily perform the photographing operation in conformity with the intention of the photographer by changing the resolving power obtained by conversion into the size of the sample photographed per one picture element.

The system may further comprise a magnifying optical system in the displaying optical system. By doing so, it is possible to magnify and observe, through the eyepiece lens, the image of the sample displayed on the display screen by using the variable power optical system. Accordingly, the portion corresponding to the picture element of the image pickup device is magnified to be easily seen. Therefore, it is easier to confirm the relationship between the size of the picture element of the image pickup device and the image to be photographed. The focal point can be adjusted by utilizing the magnified image.

According to a second aspect of the present invention, there is provided a microscopic digital photography system comprising:

a microscope having an objective lens, an eyepiece lens, and a housing for accommodating them;

an image pickup device accommodated in the housing, for photographing an image of a sample formed by the objective lens;

a screen accommodated in the housing, for displaying the image photographed by the image pickup device; and a displaying optical system accommodated in the housing, for guiding a light flux from the screen to the eyepiece lens. In this system, not only the image pickup device but also the display unit are contained in the housing or a body tube of the microscope. It is possible for the photographer to observe, through the eyepiece lens, the image projected on the screen, in the same manner as in the system according to the first aspect. Therefore, the system of the present invention can enjoy the merit that the image of the sample photographed by the image pickup device can be previously observed through the screen, while having the size or the installation area approximately equivalent to those for the conventional system. The system of the present invention may further comprise a controller for displaying the image on the screen on the basis of a signal outputted from the image pickup device.

According to a third aspect of the present invention, there is provided a photographing method for a microscopic digital photography system having a microscope and an image pickup device, comprising the steps of installing, in the microscope, a screen for displaying an image of a sample photographed by the image pickup device; observing, through an eyepiece lens, the image of the sample displayed on the screen; and photographing a digital photograph. According to this method, it is possible for the photographer to previously observe the image intended to be photographed, on the screen provided in the microscope. Accordingly, it is possible to select a proper photographing range and a proper magnification by comparing the image on the screen with the image observed directly through the microscope. Therefore, it is possible to photograph a desired image with ease in a short period of time as compared with the photographing method based on the use of the conventional microscopic digital photography system.

DESCRIPTION OF THE PREFERRED EMBODIMENTS

Figure 1:
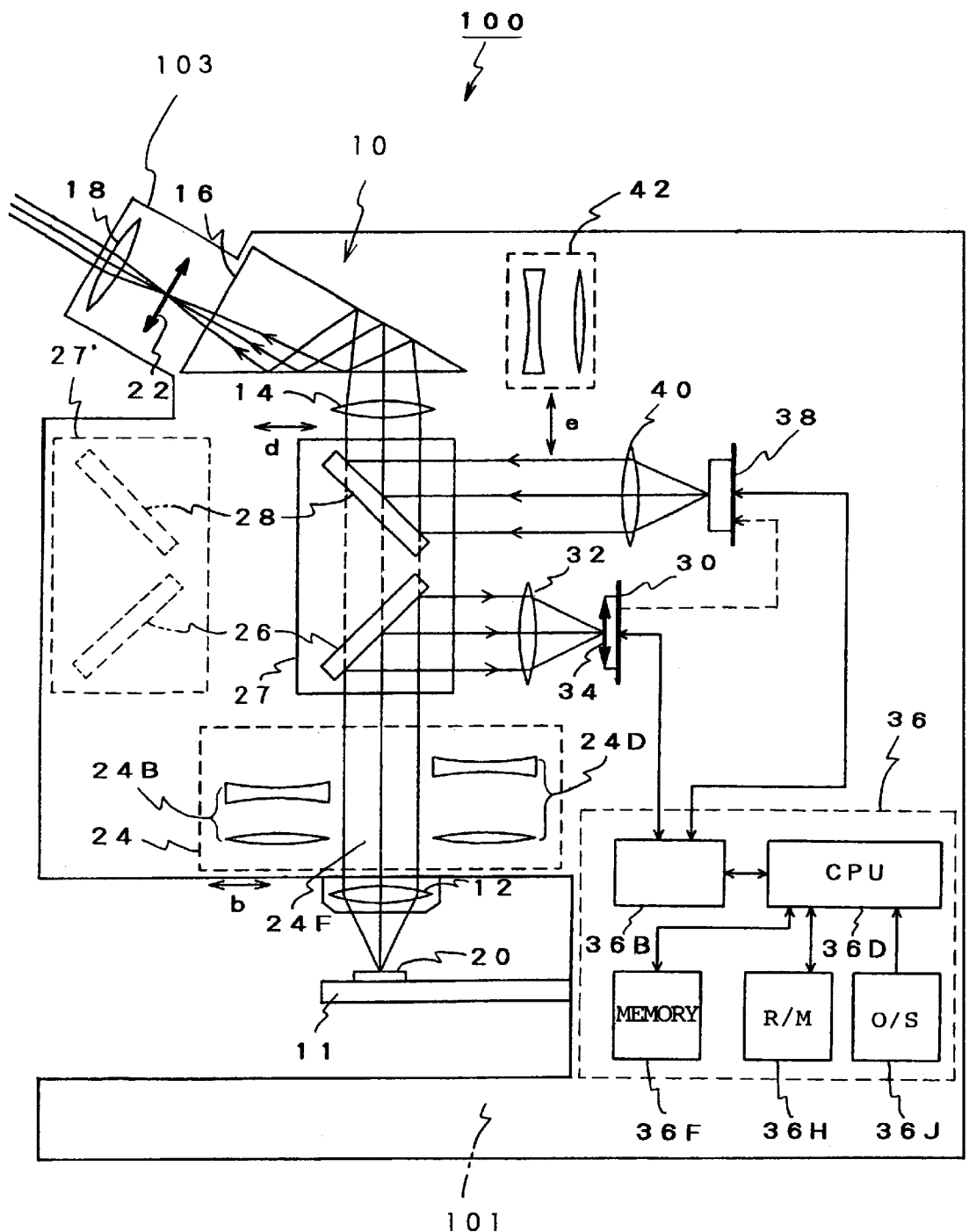
FIG. 1 conceptually shows a basic structure of a microscopic digital photography system according to an embodiment of the present invention.

An embodiment of the present invention will be explained below on the basis of FIG. 1. FIG. 1 schematically shows a basic arrangement of a microscopic digital photography system 100 according to the embodiment. The microscopic digital photography system 100 comprises a microscope 10, an image pickup device (CCD) 30 for photographing an image of a sample 20 formed by an objective lens 12 of the microscope 10 and making conversion into an electric signal, a small size liquid crystal display 38 provided with a backlight unit to serve as a display unit for displaying the image of the sample photographed by the image pickup device 30, and a display control unit 36 for converting the electric signal from the image pickup device 30 into a signal suitable for the liquid crystal display 38 to display the image of the sample 20 on a display screen of the liquid crystal display 38.

The microscope 10 comprises, for example, a microscope stage 11 for placing the sample 20 thereon, the objective lens 12, an imaging lens 14, a view prism 16, and an eyepiece lens 18, in the same manner as in an ordinary microscope. In this embodiment, an infinite focus lens (afocal lens) is used as the objective lens 12. The objective lens 12 is fixed to a main microscope body 101 which supports the microscope stage 11. The imaging lens 14, the view prism 16, and the eyepiece lens 18 are held in an observing body tube portion 103. In this embodiment, an observing optical system is constructed by the imaging lens 14, the view prism 16, and the eyepiece lens 18. It is needless to say that the eyepiece lens 18 is held by each of a pair of eyepiece body tubes of a binocular unit provided on the observing body tube portion 103.

The microscope 10 according to this embodiment comprises an image pickup optical path mirror 26 having a first reflecting surface and a display optical path mirror 28 having a second reflecting surface which are arranged between the objective lens 12 and the imaging lens 14. The two mirrors 26, 28 are incorporated into one unit and held integrally by a transparent frame 27. The frame 27 is reciprocatively movable in the horizontal direction as indicated by the arrow d in FIG. 1, by the aid of an unillustrated driving mechanism. Accordingly, the image pickup optical path mirror 26 and the display optical path mirror 28 can be integrally inserted into or retracted from the optical path formed between the objective lens 12 and the imaging lens 14. The driving mechanism may be, for example, a combination of a guide rail and a carriage for making movement thereon while holding the frame 27, or an arm for making rotation about an axis of rotation while holding the frame.

The operation of the respective constitutive sections of the microscope 10 will now be explained concerning a state in which the frame 27 is moved to a position indicated by reference numeral 27' in FIG. 1, and the image pickup optical path mirror 26 and the display optical path mirror 28 are retracted from the optical path formed between the objective lens 12 and the imaging lens 14.

In this state, an infinite correction optical system (afocal optical system) is constructed by the objective lens 12 and the imaging lens 14. The light flux from the sample 20 (light flux of the sample image) is converted into parallel light by the objective lens 12. The resultant light flux is adjusted by the imaging lens 14, and it passes through the view prism 16 to form an image (magnified image) of the sample 20 on an image plane 22 in the vicinity of a front focal plane of the eyepiece lens 18. The image of the sample is observed through the eyepiece lens 18.

On the other hand, when the frame 27 is moved to the position indicated by the solid line in FIG. 1, and the image pickup optical path mirror 26 and the display optical path mirror 28 are inserted into the optical path between the objective lens 12 and the imaging lens 14, then the light flux from the sample 20 becomes parallel light by the aid of the objective lens 12. The light flux is reflected by the image pickup optical path mirror 26, and its optical axis is folded horizontally. A second imaging lens 32 is arranged on an optical path of the light flux reflected by the image pickup optical path mirror 26. An image pick up optical system is constructed by the image pickup optical path mirror 26 and the second imaging lens 32. The image pickup device 30 described above is arranged on an image plane 34 which is a back focal plane of the second imaging lens 32.

Therefore, the image of the sample 20, which is projected by the objective lens 12, is focused on the image plane 34 by the aid of the second imaging lens 32 in the state in which the image pickup optical path mirror 26 and the display optical path mirror 28 are inserted into the optical path formed between the objective lens 12 and the imaging lens 14. The image pickup device 30 receives the light flux (light flux of the image of the sample 20) coming into the image plane 34 to make conversion into the electric signal. The image information on the image (magnified image) of the sample 20 is outputted as an image signal to a display control unit 36. The display control unit 36 is operated on the basis of the image signal so that the image of the sample 20 photographed by the image pickup device 30 is displayed on a liquid crystal display 38. Specified arrangement, function, and other features of the display control unit 36 will be described in detail later on.

A second objective lens 40, which is an afocal lens, is arranged between the liquid crystal display 38 and the display optical path mirror 28. A displaying optical system for guiding the light flux from the display screen of the display 38 to the imaging lens 14 of the observing optical system is constructed by the second objective lens 40 and the display optical path mirror 28.

Accordingly, the light flux, which comes from the display screen of the liquid crystal display 38 on which the image of the sample 20 photographed by the image pickup device 30 is displayed, is guided by the displaying optical system in the state in which the image pickup optical path mirror 26 and the display optical path mirror 28 are inserted into the optical path between the objective lens 12 and the imaging lens 14. In this state, the optical axis of the light flux from the display screen is superimposed on the optical axis of the imaging lens 14 by the aid of the display optical path mirror 28. As a result, the image on the display screen, which is formed on the image plane 22 by the aid of the imaging lens 14, can be observed through the eyepiece lens 18.

In this embodiment, a variable power unit 24 as a variable power optical system is arranged on the optical path between the objective lens 12 and the image pickup optical path mirror 26. The variable power unit 24 comprises pairs of variable power lenses 24B, 24D having different magnifications and a see-through section 24F having no lens. The variable power unit 24 is slidable in the horizontal direction as shown by the arrow b in FIG. 1. Thus, any one of the variable power lenses 24B, 24D and the see-through section 24F having no lens can be selectively disposed on the optical path of the afocal optical system between the objective lens 12 and the imaging lens 14 (or the image pickup optical path mirror 26).

In addition, a magnifying lens unit 42 is also provided, which serves as a magnifying optical system capable of sliding in the vertical direction as indicated by the arrow e in FIG. 1. The magnifying lens unit 42 can be optionally inserted into and retracted from the inside of the displaying optical system described above. In an inserted state, a part of the display screen of the liquid crystal display 38 is magnified and projected to the observing optical system.

Next, detailed explanation will be made for the display control unit 36 which constructs the microscopic digital photography system 100 according to this embodiment. The display control unit 36 is provided for the following purpose. That is, the electric signal (image signal) outputted from the image pickup device 30 is converted into the signal suitable for the liquid crystal display 38, and the image of the sample 20 is displayed on the display screen of the liquid crystal display 38. The display control unit 36 is accommodated in the housing of the microscope 10 together with the image pickup device 30. Accordingly, the entire system has its size which is suppressed to be approximately equivalent to those of ordinary microscopes.

The display control unit 36 comprises, for example, a signal-processing section 36B, CPU 36D, a memory 36F, a recording medium (R/M) 36H, and an operating section (O/S) 36J. The signal-processing section 36B processes and converts the image information on the image of the sample 20 from the image pickup device 30 into the signal suitable for the display 38 as composed of digital values. The display control unit 36 stores, in the memory 36F, the image information on the image of the sample 20 supplied from the image pickup device 30 processed by the signal-processing section 36B, by the aid of the processing performed by CPU 36D. The image information is transmitted to the liquid crystal display 38 to display the image of the sample 20 on the display screen. The operating section 36J has a key pad or the like, and it serves as an input device for CPU 36D. The display control unit 36 is operated to record, on the recording medium 36H, the image information on the image of the sample 20 stored in the memory 36F in accordance with the processing performed by CPU 36D. Various memories capable of recording digital data may be used as the recording medium 36H. Those usable as the recording medium 36H include, for example, memory cards, magnetic recording media such as flexible disks and magnetic disks, magneto-optical recording media such as magneto-optical disks, and optical recording media such as digital versatile disks.

Next, explanation will be made for the digital photography effected by the microscope of the microscopic digital photography system 100 constructed as described above.

At first, the photographer places the sample 20 on the microscope stage 11. The frame 27 is moved by the aid of the unillustrated driving mechanism to insert the mirrors 26, 28 into the optical path between the objective lens 12 and the imaging lens 14. In this state, the image of the sample 20 is photographed by the image pickup device 30, and it is displayed on the display screen of the liquid crystal display 38 by the aid of the display control unit 36. Thus, the image range, which is captured by the image pickup device 30, is displayed on the display screen of the display 38 in real time or in a form approximate thereto. The light flux from the display screen is used to form the image on the image plane 22 in the vicinity of the front focal plane of the eyepiece lens 18 by the aid of the displaying optical system and the imaging lens of the observing optical system. The photographer, who looks into the eyepiece lens 18, observes the entire area of the display screen through the eyepiece lens 18. The photographer operates an unillustrated sample movement handle while looking into the eyepiece lens 18 so that the microscope stage 11 is moved in the horizontal plane (XY plane) to determine the photographing range for the sample 20. At this time, the photographer operates the unillustrated focusing handle to adjust the focal point.

In this state, the image of the sample 20 displayed on the display screen can be used to compare the image intended to be photographed from now on, with the size of the picture element of the image pickup device. Therefore, it is possible to easily confirm how the sample 20 is photographed together with the photographing range of the sample 20. Further, it is possible to easily confirm the relationship between the image projected onto the image pickup device 30 and the size of the picture element of the image pickup device 30.

When it is difficult to perform the confirmation as a result of the observation through the eyepiece lens 18 because the image viewed through the eyepiece lens 18 is too small, the magnifying lens unit 42 is inserted into the display optical path between the display optical path mirror 28 and the second objective lens 40. The image of the sample 20 displayed on the display screen of the liquid crystal display 38 is magnified by using the magnifying lens unit 42 to make observation through the eyepiece lens 18. The portion of the sample, which corresponds to one picture element of the image pickup device 30, is magnified to be seen easily. Accordingly, it is easier to confirm the relationship between the size of the picture element of the image pickup device 30 and the image to be photographed, i.e., the resolving power for the image of the sample 20 photographed by the image pickup device 30. The magnified image may be used not only to confirm the resolving power for the image of the sample, but also to adjust the focal point so that the sample 20 is photographed more vividly.

When the size of the image projected onto the image pickup plane 34 of the image pickup device 30 is adjusted, the variable power unit 24 is allowed to slide to insert the variable power lens 24B or 24D into the optical axis of the microscope in order to change the magnification of the image projected onto the image pickup plane 34 of the image pickup device 30. This operation is equivalent to the change of the resolving power as obtained by making conversion into one given on the sample plane of the image. The image, which has been subjected to the change of magnification, is observed on the display screen of the liquid crystal display 38 by the aid of the eyepiece lens 18. Accordingly, it is possible to easily recognize the relationship between the size of the picture element of the image pickup device 30 and the range of the sample image projected thereonto, by means of the observation through the eyepiece lens 18, to which appropriate change may be made. Therefore, it is easy to perform the photographing operation in conformity with the intention of the photographer.

When the image pickup optical path mirror 26 and the display optical path mirror 28 are retracted and disposed out of the optical axis, the original microscopic image of the sample, which is formed by the objective lens 12 and the imaging lens 14, can be observed through the observing optical system. Thus, the original microscopic image can be compared with the image intended to be photographed by using the image pickup device 30, by switching the original microscopic image and the image formed by the liquid crystal display 38. Therefore, it is easier to confirm the relationship between the size of the picture element of the image pickup device 30 and the image to be photographed.

As described above, the photographing range of the image of the sample 20 is balanced with the resolving power obtained by making conversion for the sample plane of the image to be photographed. When a just appropriate image is obtained, an exposure switch of the operating section 36J is operated to record the image of the sample 20 on the recording medium 36H. When the photographing operation is completed, then the recording medium 36H, on which the image of the sample 20 has been recorded, is removed, and thus the recorded in formation can be read or viewed by using a personal computer or the like.

As explained above, according to this embodiment, the di splay screen of the liquid crystal display 38 can be observed through the eyepiece lens 18. Accordingly, it is possible to easily confirm the relationship between the size of the picture element of the image pickup device 30 and the image to be photographed. In the present invention, the way of observation for the image of the sample 20 displayed on the display screen is the same as the way for the observing operation for ordinary microscopes. Therefore, the system of the present invention is extremely convenient to be used. The image intended to be photographed can be confirmed without installing any large size monitor. Therefore, it is possible to provide the system which occupies a small area on the desk on which the microscope is placed. If the image of the sample is observed by using an ordinary monitor, any bad influence is exerted on the observation by reflected or scattered light such as illumination light in the room. On the contrary, in the case of this embodiment, the observation is performed through the eyepiece lens 18. Accordingly, it is possible to completely intercept the external light. Therefore, it is unnecessary to make any countermeasure such as those for darkening illumination in the room, which would be otherwise made due to the fear for the influence.

In the embodiment described above, the mirrors 26, 28, the lenses 32, 40, the image pickup device 30, the liquid crystal display 38, and the display control unit 36 may be integrated into one unit by arranging them in one housing. The unit may be structured to be detachable with respect to the microscope. A specified embodiment of this structure will be explained with reference to FIGS. 2 and 3.

Figure 2:
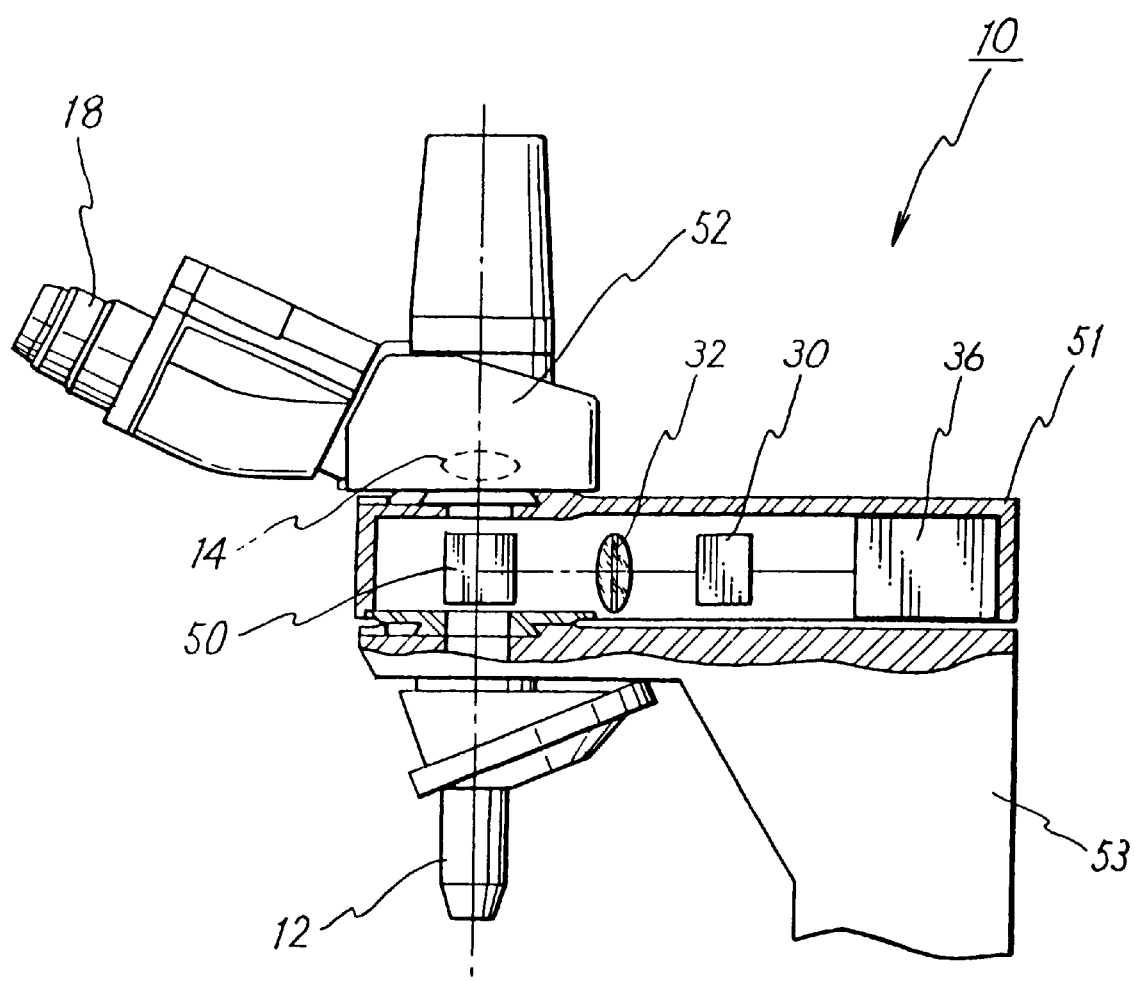
FIG. 2 shows a modified embodiment concerning the embodiment shown in FIG. 1, illustrating a structure in which a digital photographing unit and an observing body tube 52 are detachably arranged on a main microscope body respectively.

As shown in FIG. 2, a digital photographing unit 51 is provided on a main body 53 of the microscope 10. An observing body tube 52 is arranged on the unit 51. An attachment section of the unit 51 with respect to the main body 52 and an attachment section of the body tube 52 with respect to the unit 51 are detachable respectively, and they have the same attachment structure. Therefore, when the unit 51 is not used, then the unit 51 is removed from the main microscope body 53, and the observing body tube 52 can be directly installed to the main microscope body 53.

Figure 3:
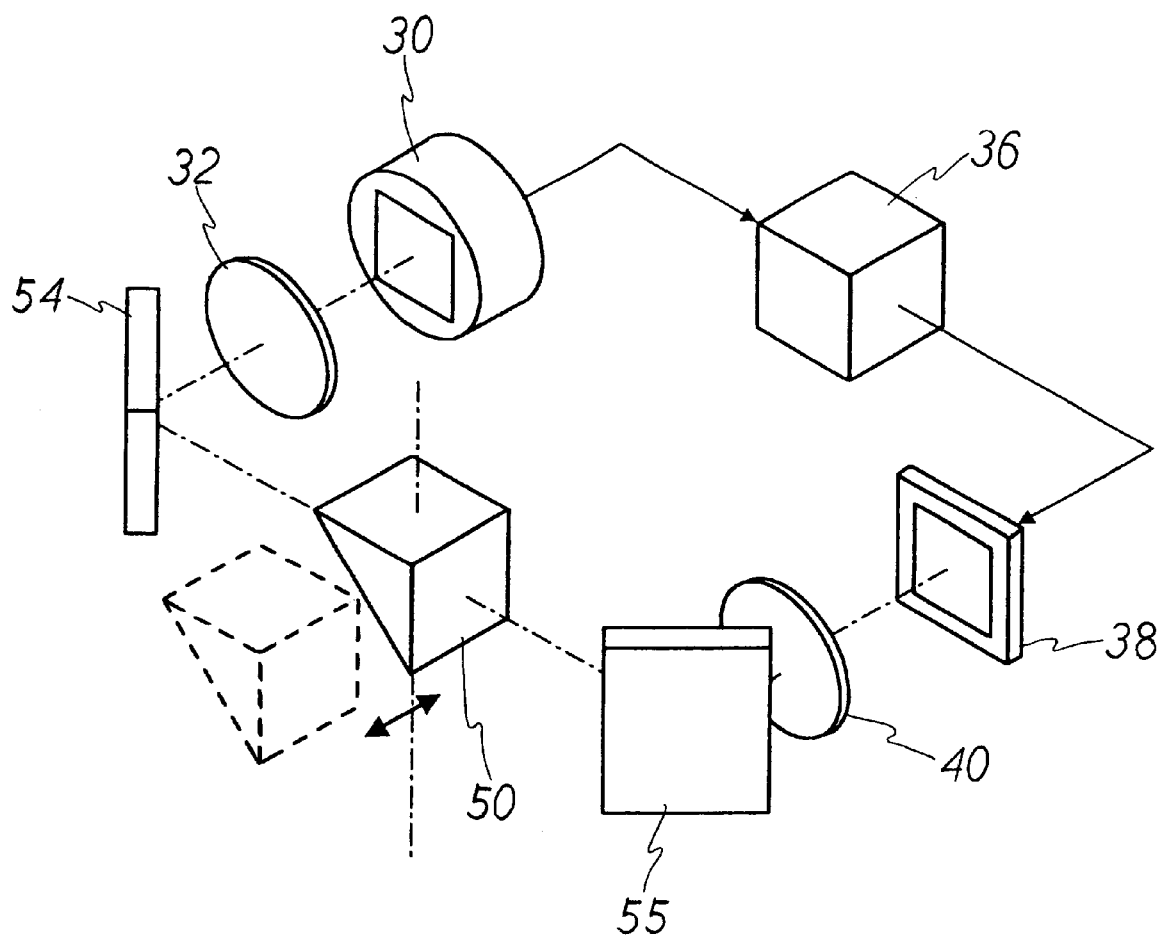
FIG. 3 shows a perspective view conceptually illustrating an arrangement of optical elements provided in the digital photographing unit.
Figure 4:
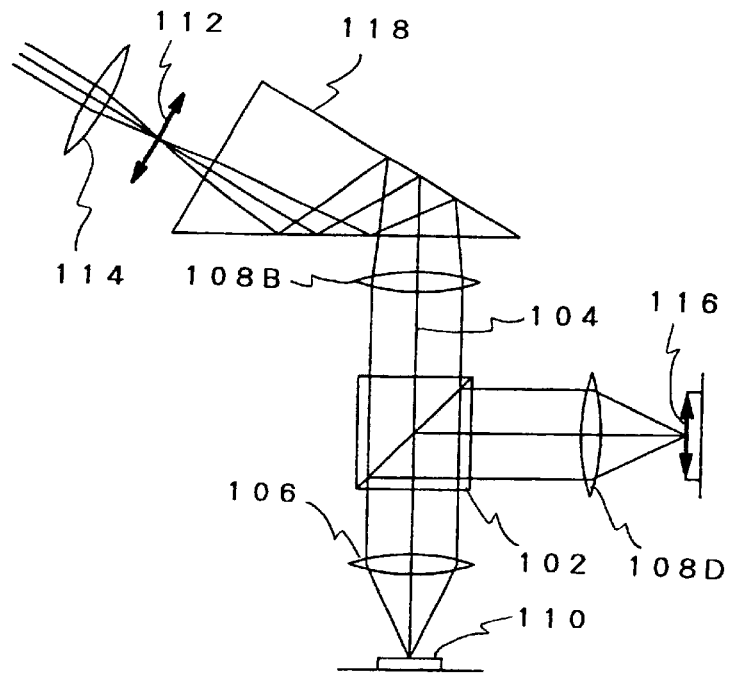
FIG. 4 conceptually illustrates an arrangement of a conventional optical system for dividing a light flux into those concerning an observing optical system and an image pickup optical system.
Figure 5:
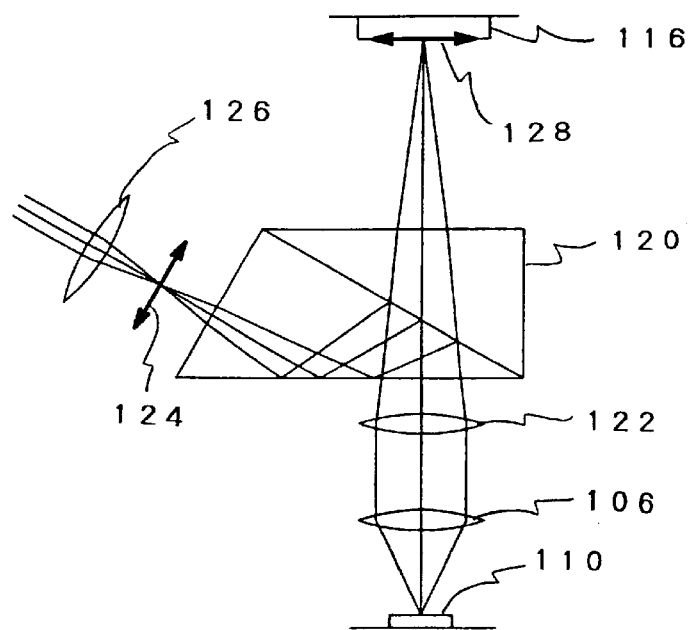
FIG. 5 conceptually illustrates another arrangement of a conventional optical system for dividing a light flux into those concerning an observing optical system and an image pickup optical system.

FIG. 3 shows a perspective view conceptually illustrating the arrangement of the respective members provided in the digital photographing unit 51. The light flux (indicated by an alternate long and short dash line) from the objective lens 12 is reflected perpendicularly by a total reflection prism 50, and it comes into an image pickup device 30 through an image pickup optical path mirror 54 and a second imaging lens 32. The signal from the image pickup device is converted by a display control unit 36 into a signal suitable for a liquid crystal display 38. The light flux of an image formed on a screen of the liquid crystal display 38 comes into the total reflection prism 50 again through a second objective lens 40 and a display optical path mirror 55, and it is reflected perpendicularly. After that, an image is formed by the imaging lens 14, and the image is observed by the aid of the eyepiece lens 18.

The total reflection prism 50 is provided in the unit 51, which is movable by the aid of an unillustrated driving mechanism. Accordingly, the total reflection prism 50 can be inserted into and retracted from the optical path of the microscope. When the total reflection prism 50 is disposed out of the optical path, the light flux from the objective lens 12 is directly guided to the imaging lens 14. When such a structure is adopted, the unit 51 may be removed from the microscope if the digital photographing operation is not performed. Accordingly, the microscope may be made compact.

The system described in the embodiment of the present invention can be modified and improved in various ways. For example, as for the display control unit 36, an interface may be provided on the side of the microscope 10 with respect to a computer. The microscope 10 may be connected to a small size personal computer via the interface to realize the function of the display control unit 36 by using the personal computer. In this embodiment, the image, which is intended to be photographed by the image pickup device 30, can be displayed on the display screen of the liquid crystal display 38 by utilizing CPU, a signal-processing section, a recording medium, and an operating section of the small size personal computer. Therefore, this embodiment is advantageous in that the system can be cheaply constructed while maintaining the excellent way of use.

It is also possible to allow the liquid crystal display 38 to have a function to make display with an arbitrary magnification. When the number of picture elements of the liquid crystal display 38 is smaller than the number of picture elements of the image pickup device 30, this function makes it possible to display, on the liquid crystal display 38, a reduced image obtained by using the image pickup device 30 in accordance with an instruction given by the photographer from the operating section (for example, a keyboard or a mouse) in order to confirm the photographing range. It is also possible to provide a function to display, on the liquid crystal display 38, a magnified image obtained by using the image pickup device 30. It is assumed that this function makes it easy to observe minute portions of the photographed image.

Alternatively, the following arrangement may be conceived. That is, the image pickup device 30 and the liquid crystal display 38 are not contained in the microscope 10. A compatible mount may be provided at the optical path output section and the optical path input section of the microscope 10. The photographer can arbitrarily select a digital still camera and a liquid crystal display. In this embodiment, the image output of the digital still camera mounted at the optical path output section is connected to the liquid crystal display device mounted at the optical path input section to display the image of the sample photographed by using the digital still camera. It is also possible in this embodiment to display the image obtained by using the digital still camera on the liquid crystal display with an arbitrary magnification by performing the operation by the photographer by using the operating section of the digital still camera. Further, an arrangement may be available, in which the photographer can incorporate an arbitrary digital still camera or an arbitrary liquid crystal display into the microscope. Such an arrangement is advantageous in that the digital still camera and the liquid crystal display device can be selected depending on the purpose of the photographing operation and the price.

The embodiments have been explained above for the case in which the small size liquid crystal display is used as the display unit. However, the present invention is not limited thereto. For example, a small size Braun tube or a plasma display may be used as the display unit. The embodiments have been explained above for the case in which CCD is used as the image pickup device. However, there is no limitation thereto, and other solid image pickup devices may be used. In the embodiments described above, the two mirrors, i.e., the image pickup optical path mirror 26 and the display optical path mirror 28 are used as the reflecting optical element (reflecting member) having the first and second reflecting surfaces. Alternatively, it is allowable to use a prism.

In the embodiments described above, when the system of the present invention is used as the microscope, namely when the system is used in the state in which the reflecting optical element having the first and second reflecting surfaces (for example, the image pickup optical path mirror 26 and the display optical path mirror 28) is removed from the optical axis of the microscope, the system may be modified as follows. When it is intended to change only the magnification of projection onto the image pickup device 30 without changing the magnification of the image of the microscope, the variable power unit 24 may be arranged not on the optical axis of the microscope but on the image pickup optical path ranging from the image pickup optical path mirror 26 to the image pickup device 30.

As explained above, according to the present invention, it is possible to easily confirm the resolving power for the image to be photographed and the range of the image projected onto the image pickup device during the photographing operation. Further, the confirmation can be easily performed through the eyepiece lens in the same manner as in the ordinary microscopic observation. Furthermore, the magnified image can be observed while performing comparison with the naked eye and the image pickup device. Thus, it is easier to confirm the resolving power for the image.

What is claimed is:

1. A microscopic digital photography system for observing and photographing a sample, comprising:
    a microscope having an objective lens and an eyepiece lens;
    an image pickup device for photographing an image of the sample formed by the objective lens;
    a display unit having a screen for displaying the image;
    a controller for controlling the display unit so that the image is displayed on the screen of the display unit on the basis of a signal outputted from the image pickup device;
    a first optical system for guiding a light flux from the screen to the eyepiece lens; and
    at least one reflecting optical element having a first reflecting surface for guiding a light flux from the objective lens to the image pickup device and a second reflecting surface for constructing the first optical system, wherein the first and second reflecting surfaces are insertable and retractable from an optical path between the objective lens and the eyepiece lens.

2. The system according to claim 1, further comprising a frame for holding the at least one reflecting optical element and a movement unit for inserting or retracting the frame with respect to the optical path between the objective lens and the eyepiece lens.

3. The system according to claim 1, further comprising a second optical system for guiding the image of the sample formed by the objective lens to the image pickup device, the second optical system being disposed between the objective lens and the image pickup device.

4. The system according to claim 1, further comprising a housing for holding at least the reflecting optical element, the image pickup device, the display unit, and at least a part of the first optical system, wherein:
    the microscope has a main microscope body for holding the objective lens and a body tube for holding the eyepiece lens, and the housing is arranged detachably between the main microscope body and the body tube.

5. The system according to claim 1, further comprising a variable power optical system arranged on an optical path between the objective lens and the first reflecting surface.

6. The system according to claim 1, further comprising a magnifying optical system provided in the first optical system.

7. The system according to claim 1, wherein the microscope is provided with a housing, and the display unit and the image pickup device are accommodated in the housing.

8. The system according to claim 1, further comprising a recording section for recording the photographed image on a recording medium.

9. The system according to claim 1, wherein the display unit is a liquid crystal display.

10. The system according to claim 1, wherein the eyepiece lens is a binocular type lens having a pair of ocular lenses.

11. A microscopic digital photography system comprising:
    a microscope having an objective lens, an eyepiece lens, and a housing for accommodating the objective lens and the eyepiece lens;
    an image pickup device accommodated in the housing, for photographing an image of a sample formed by the objective lens;
    a screen accommodated in the housing, for displaying the image photographed by the image pickup device;
    a first optical system accommodated in the housing, for guiding a light flux from the screen to the eyepiece lens; and
    at least one reflecting optical element having a first reflecting surface for guiding a light flux from the objective lens to the image pickup device and a second reflecting surface for constructing the first optical system, wherein the first and second reflecting surfaces are insertable and retractable from an optical path between the objective lens and the eyepiece lens.

12. The system according to claim 11, further comprising a controller for controlling the screen to display the image on the screen on the basis of a signal outputted from the image pickup device.

13. The system according to claim 11, further comprising a frame for holding the at least one reflecting optical element and a movement unit for inserting and retracting the frame with respect to the optical path between the objective lens and the eyepiece lens.

14. The system according to claim 11, further comprising a recording section for recording the photographed image on a recording medium.

15. The system according to claim 11, wherein a resolving power of the image pickup device is lower than a resolving power of the naked eye.

16. The system according to claim 11, wherein the eyepiece lens is a binocular type lens having a pair of ocular lenses.

* * * * *